United States Patent [19]
Kabuto et al.

[11] Patent Number: 5,097,714
[45] Date of Patent: Mar. 24, 1992

[54] STEERING TORQUE DETECTING APPARATUS

[75] Inventors: Katsukuni Kabuto, Inuyama; Fumikazu Sugimoto, Kani; Manabu Yomada, Amagasaki; Masaki Yoshida, Ibaragi, all of Japan

[73] Assignee: Kayaba Industry Co., Ltd., Tokyo, Japan

[21] Appl. No.: 580,806

[22] Filed: Sep. 11, 1990

[30] Foreign Application Priority Data

Sep. 11, 1989 [JP] Japan .............................. 1-106580[U]

[51] Int. Cl.⁵ .......................... G01L 3/14; B63H 21/26
[52] U.S. Cl. ............................... 73/862.19; 114/144 R; 440/62

[58] Field of Search ........................ 73/862.19, 862.33; 74/500.5, 496, 501.6; 340/984, 987, 465; 114/144 R; 440/62

[56] References Cited

U.S. PATENT DOCUMENTS 4,993,976  2/1991  Kabuto et al. .............. 114/144 R X

FOREIGN PATENT DOCUMENTS 0144295  6/1990  Japan ..................................... 440/62

*Primary Examiner*—Charles A. Ruehl
*Attorney, Agent, or Firm*—Morrison Law Firm

[57] ABSTRACT

A steering torque detecting apparatus capable of being simplified in structure and readily assembled. Potentiometers each are actuated in association with the movement of a cable wire to generate an output signal. Steering control is carried out depending upon the output signal.

5 Claims, 2 Drawing Sheets

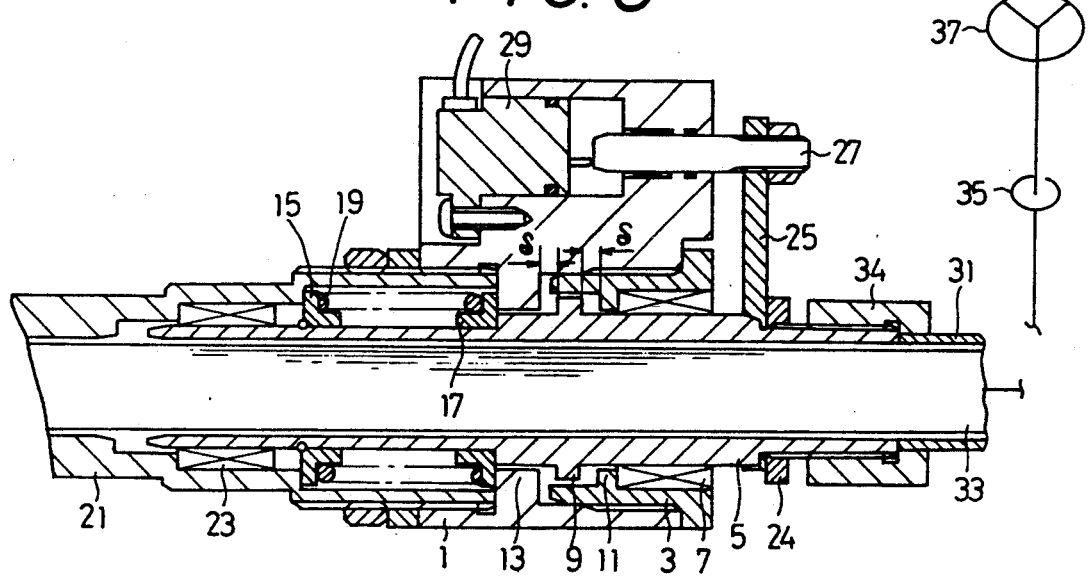
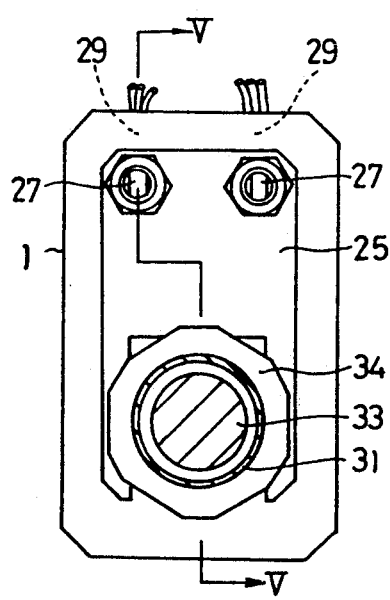
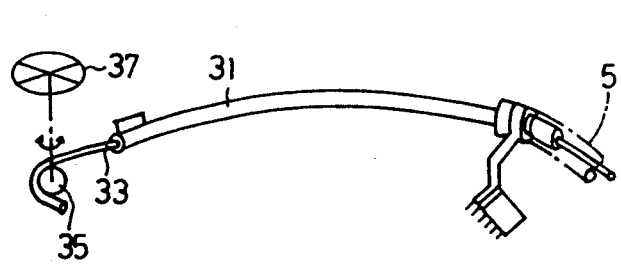
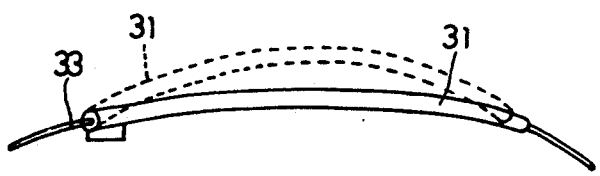

ent invention can be significantly improved in structure
STEERING TORQUE DETECTING APPARATUS

BACKGROUND OF THE INVENTION

This invention relates to a steering torque detecting apparatus, and more particularly to a steering torque detecting apparatus which is simplified in structure, readily assembled and exhibits high reliability.

Now, a conventional steering torque detecting apparatus will be described with reference to FIGS. 1 to 3. FIG. 1 shows a conventional steering system for an outboard motor. A steering handle 101 is provided so as to be rotatably operated in any desired direction. The rotation of the steering handle 101 is transmitted through a steering wire 102, a slide member 105, a steering rod 107 and an oscillation lever 109 to an outboard motor 111.

Steering force input to the steering wire 102, as shown in FIG. 2, is also transmitted through an interlocking element 113 and a transmission rod 115 to a torque sensor 117. The torque sensor 117 includes a sensor body 121 slidably arranged in a housing 119 as shown in FIG. 3. The sensor body 121 is normally held at a neutral position by means of a spring 123. The sensor body 121 is formed at a part thereof into a reduced diameter, resulting in providing a reduced diameter section 125, on which a strain sensor 127 is mounted. The sensor body 121 is also connected to the transmission rod 115. To the strain sensor 127 is connected a signal cable 129, which is arranged so as to externally extend through a through-hole 131 formed at the housing 119.

When the sensor body 121 which is connected to the transmission rod 115 as described above is forced in the longitudinal direction thereof against the spring 123, strain occurs on the reduced diameter section 125 of the sensor body 121. The so-produced strain is detected by the strain sensor 127 and then input to a controller 133 shown in FIG. 1. The controller 133 serves to calculate power assisting force depending upon a detection signal supplied from the strain sensor 127 to generate a control signal, which is then supplied to a drive motor 135, leading to rotation of the drive motor 135. The rotation of the drive motor 135 causes a pinion 137 (FIG. 2) to be rotated, so that a rack 139 is moved in a suitable direction.

Such movement of the rack 139 results in the power assisting force being applied through the steering rod 107 to the oscillation lever 109.

Unfortunately, it was found that the conventional steering torque detecting apparatus constructed as described above has the following problems.

First, the operation of mounting the strain sensor 127 on the torque sensor 117 is highly troublesome, because it must be carried out in a narrow space in the housing 119.

Another problem of the conventional steering torque detecting apparatus is that the strain sensor 127 is readily subject to a radio trouble or fault. This adversely decreases the level of output of the strain sensor to a degree sufficient to cause the apparatus to require an amplifier, resulting in the apparatus being highly large-sized and costly.

SUMMARY OF THE INVENTION

The present invention has been made in view of the foregoing disadvantages of the prior art.

Accordingly, it is an object of the present invention to provide a steering torque detecting apparatus which is capable of being significantly simplified in structure.

It is another object of the present invention to provide a steering torque detecting apparatus which is capable of facilitating the assembling operation.

It is a further object of the present invention to provide a steering torque detecting apparatus which is capable of generating the output of a desired level.

It is still another object of the present invention to provide a steering torque detecting apparatus which is capable of being manufactured at a low cost.

In accordance with the present invention, a steering torque detecting apparatus is provided. The apparatus includes a plunger formed into a hollow shape and arranged so as to be movable in a predetermined range, an elastic means for normally keeping the plunger at a neutral position, at least one potentiometer connected to the plunger through an actuation section, a steering cable formed into a hollow shape and connected to the plunger, and a cable wire movably inserted through the plunger and steering cable and connected to a steering handle. The cable wire is moved due to rotation of the steering handle in a suitable direction to generate reaction force. The steering cable is varied in curvature depending upon the reaction force of the cable wire to move the plunger, resulting in the potentiometer being actuated through the actuation section.

In the steering torque detecting apparatus of the present invention constructed as described above, rotation of the steering handle in a suitable direction causes the cable wire to be moved in a desired direction. The movement of the plunger leads to actuation of the potentiometer through the actuation section, resulting in the potentiometer detecting steering torque.

The steering torque detecting apparatus of the present invention can be significantly improved in structure and readily assembled. Also, the present invention effectively eliminates disadvantages due to a radio trouble to improve the reliability.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIGS. 1 to 3 show a conventional steering torque detecting apparatus, wherein FIG. 1 is a perspective view showing a conventional steering device, FIG. 2 is a partially sectional view of the steering device shown in FIG. 1 and FIG. 3 is a sectional view showing a torque sensor; and FIGS. 4 to 7 show an embodiment of a steering torque detecting apparatus according to the present invention, wherein FIG. 4 is a front elevation view showing an embodiment of a steering torque detecting apparatus according to the present invention, FIG. 5 is a sectional view taken along line V—V of FIG. 4 and FIGS. 6 and 7 each are a schematic view showing the operation of the steering torque detecting apparatus.

DETAILED DESCRIPTION OF THE PREFERRED EMBODIMENT

Figure 2:
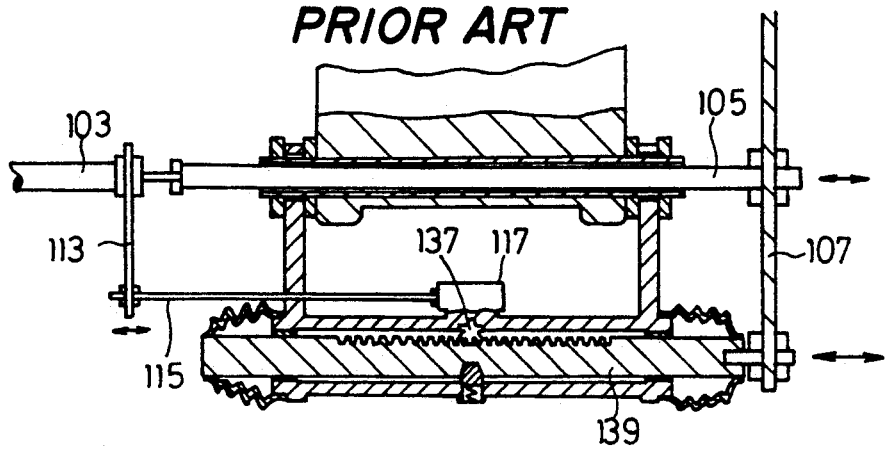
Figure 3:
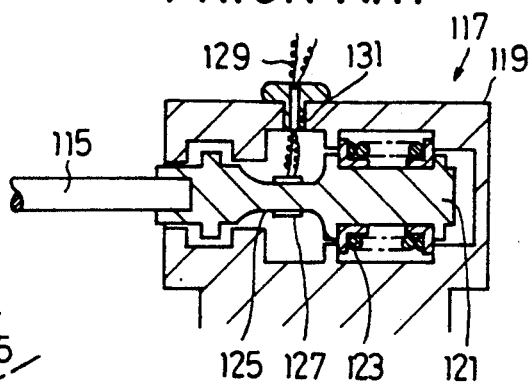
Figure 1:
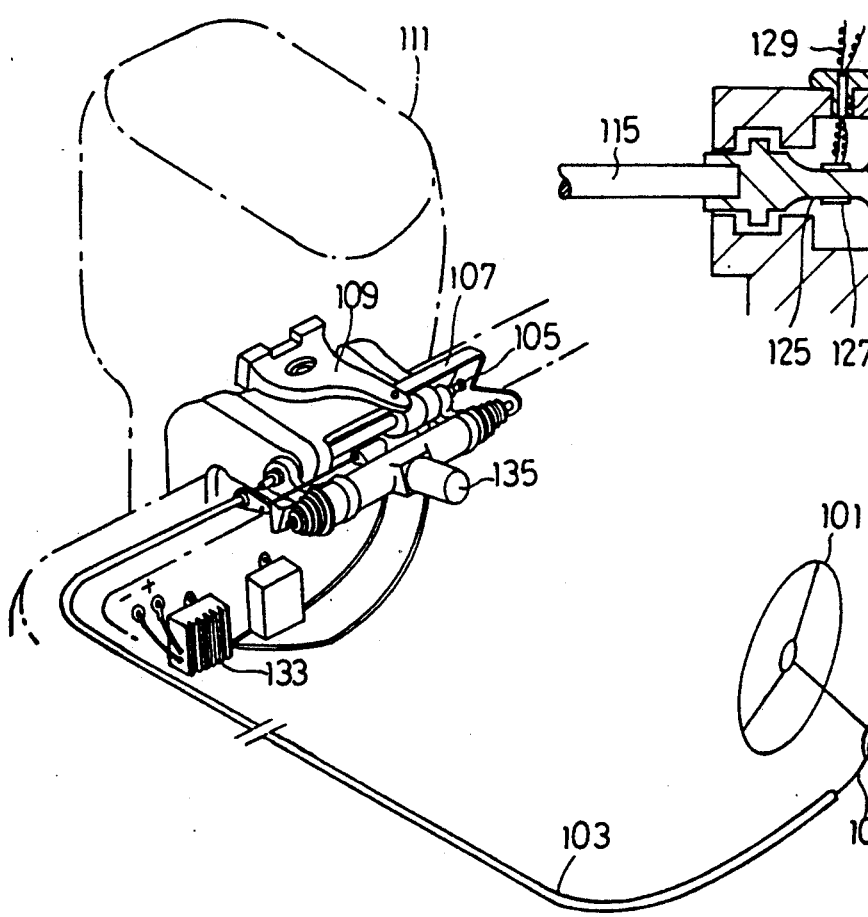

Now, a steering torque detecting apparatus according to the present invention will be described hereinafter with reference to FIGS. 4 to 7, wherein like reference numerals designate like or corresponding parts throughout.

FIGS. 4 and 5 show an embodiment of a steering torque detecting apparatus according to the present invention. A steering torque detecting apparatus of the illustrated embodiment includes a first casing 1, in which a sleeve 3 is arranged. Also, in the casing 1 is arranged a plunger 5 in a manner to be positioned on the inside of the sleeve 3 and movable within a predetermined range in the longitudinal direction thereof. Between the sleeve 3 and the plunger 5 is arranged a bushing 7.

The plunger 5 is provided on the outer surface thereof with a ring-like projection 9 and the sleeve 3 is provided on the inner surface thereof with a ring-like projection 11. Further, the first casing 1 is provided on the inner surface thereof with a ring-like projection 13. The ring-like projections 9, 11 and 13 are so arranged that the projection 9 abuts against each of the projections 11 and 13 to permit the plunger 5 to be moved by a distance for every abutment, as well as regulate the amount of movement of the plunger 5.

The amount of movement of the plunger 5 is determined so as to permit a potentiometer described below to be kept at satisfactory conditions and a signal to be adequately taken out from the potentiometer.

The plunger 5 is constantly forced by means of an elastic means 19 in the form of a coiled spring arranged between end members 15 and 17, resulting in being normally held at a predetermined neutral position. On the outside of the coiled spring 19 is arranged a second casing 21, which is threadedly inserted at one end thereof in the first casing 1. Between the second casing 21 and the plunger 5 is arranged a bushing 23.

On the plunger 5 is fixedly mounted a lever 25 by means of a lock nut 24, and to the lever 25, as shown in FIG. 4, is fixedly connected at least one push rod 27. Also, in the casing 1 is arranged at least one potentiometer 29, which is adapted to be operated when it is pressedly forced through the push rod 27. In the illustrated embodiment, two such potentiometers 29 are arranged and correspondingly two such push rods 27 are arranged between the lever 25 and the potentiometers 29 in a manner to be operatively connected therebetween.

To the plunger 5 is connected a steering cable 31 by means of a connection nut 34. Also, a cable wire 33 is arranged in a manner to be inserted through the plunger 5 and steering cable 31. To the cable wire 33 is connected a steering handle 37 through a pulley 35.

The remaining part of the illustrated embodiment may be constructed in a manner similar to the prior art described above.

Now, the manner of operation of the steering torque detecting apparatus described above will be described hereinafter with reference to FIGS. 4 to 7.

The steering handle 37 kept at a state shown in FIG. 6 is rotated in a desired direction. This causes the cable wire 33 to be moved correspondingly. Such movement of the cable wire 33 generates reaction force sufficient to cause the curvature of the steering cable 31 to be varied as indicated at broken lines in FIG. 7. The variation in curvature of the steering cable 31 causes a free end of the steering cable 3 on the side of the plunger 5 to be moved, so that the plunger 5 connected to the steering cable 3 may be likewise moved. The movement of the plunger 5 then leads to movement of the lever 25 and push rods 27, resulting in the potentiometers 29 each being actuated to generate a detection signal indicating detection of steering torque.

The detection signals from the potentiometers 29 are input to a controller which may be constructed as in the prior art described above. The controller calculates power assisting force depending upon the so-input detection signals, to thereby supply a control signal to a drive motor.

In the illustrated embodiment, two such potentiometers 29 are arranged. Therefore, when, for example, one of the potentiometers causes malfunction, the other potentiometer detects it to turn off the apparatus.

When the steering handle 37 is not operated, the coiled spring 19 keeps the plunger 5 at the neutral position.

As can be seen from the foregoing, the steering torque detecting apparatus of the illustrated embodiment is simplified in structure, resulting in being readily assembled. In particular, the embodiment eliminates troublesome works such as the arrangement of a strain sensor in a narrow space and the like as in the conventional apparatus. Also, the illustrated embodiment substitutes a potentiometer having resistance to a radio trouble for a strain sensor substantially free of such resistance, resulting in a high output level being produced without using an amplifier.

Further, the use of the two potentiometers 29 in the illustrated embodiment improves reliability of the apparatus.

Moreover, the plunger 5 and sleeve 3 which are subject to reaction force from the cable wire 33 are arranged in a manner to coaxial with the cable wire 33. Such arrangement ensures satisfactory sliding of the plunger 5 while decreasing frictional resistance of the plunger, to thereby improve feeling of the steering.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A steering torque detecting apparatus comprising:
    a plunger formed into a hollow shape and arranged so as to be movable in a predetermined range;
    an elastic means for normally keeping said plunger at a neutral position;
    at least one potentiometer connected to said plunger through an actuation section;
    a steering cable formed into a hollow shape and connected to said plunger;
    a cable wire movably inserted through said plunger and steering cable and connected to a steering handle;
    said cable wire being moved due to rotation of said steering handle in a suitable direction to generate reaction force;
    said steering cable being varied in curvature depending upon said reaction force of said cable wire to move said plunger, resulting in said potentiometer being actuated through said actuation section.

2. A steering torque detecting apparatus as defined in claim 1, wherein said elastic means comprises a coiled spring.

3. A steering torque detecting apparatus as defined in claim 1, wherein said actuation section comprises a lever mounted on said plunger and a push rod operatively connected between said lever and said potentiometer.

4. A steering torque detecting apparatus as defined in claim 1, wherein two said potentiometers are arranged.

5. A steering torque detecting apparatus as defined in claim 4, wherein said actuation section comprises a lever mounted on said plunger and push rods arranged corresponding to said potentiometers;

said push rods being operatively connected between said lever and said potentiometers.

* * * * *